United States Patent [19]
Nagai

[11] Patent Number: 5,828,632
[45] Date of Patent: Oct. 27, 1998

[54] DISK RECORDING AND REPRODUCING APPARATUS

[75] Inventor: Yasuo Nagai, Kanagawa, Japan

[73] Assignee: Sony Corporation, Tokyo, Japan

[21] Appl. No.: 858,585

[22] Filed: May 19, 1997

[30] Foreign Application Priority Data

May 20, 1996 [JP] Japan ..................................... 8-124705

[51] Int. Cl.$^6$ ....................................................... G11B 7/00
[52] U.S. Cl. ............................................................... 369/32
[58] Field of Search .................................. 369/32, 44.27, 369/44.26, 44.29, 44.37, 48, 47

[56] References Cited

U.S. PATENT DOCUMENTS 5,600,623  2/1997  Miyazaki et al. ........................... 369/13

*Primary Examiner*—Nabil Hindi
*Attorney, Agent, or Firm*—Frommer Lawrence & Haug LLP; William S. Frommer

[57] ABSTRACT

A multi-head disk recording and reproducing apparatus, wherein sector synchronization signals obtained from a first optical pick-up and a second optical pick-up are input to a phase comparator where phases are compared, and a preceding sector synchronization signal is output to an overall control unit. In the overall control unit, the processing is carried out with respect to a first optical pick-up and second optical pick-up by a procedure using this input preceding sector synchronization signal as a reference. First, during a term where addresses are determined in the pick-ups, a sled servo and a spindle servo operation are carried out with respect to each pick-up. When the maximum time t of phase deviation has elapsed and addresses are determined, a tracking servo, focus servo, laser control, and other operations are instructed to the control units based on the addresses.

5 Claims, 7 Drawing Sheets

DISK RECORDING AND REPRODUCING APPARATUS

BACKGROUND OF THE INVENTION

1. Field of the Invention

The present invention relates to a disk recording and reproducing apparatus for performing the recording and/or reproduction of signals to and from a disk-like recording medium.

2. Description of the Related Art

For example, where it is intended to record and/or reproduce signal with respect to a disk-like recording medium, for example, an optical disk, at a high speed, there is known a technique in which the recording and reproduction of the signal are simultaneously carried out with respect to one optical disk by using two optical pick-ups (OP) so as to double the data transfer rate.

In such a multi-head optical disk apparatus, the following control has been carried out for each optical pick-up.

Each head performs the recording and/or reproduction of the signal in units of sectors, so even in a case where a plurality of optical pick-ups are used, the references for the timing of these processing procedures must be matched with the divisions of the sectors. For this reason, first, a timing is detected and address information is read at that timing, then the sector of the intended address is sought. At this time, processing procedures such as a selection of whether to use a sled seek (coarse seek) or to use a track jump (fine seek) up to that address and the setting of the power of the laser are carried out.

Reproduction timings, that is, phases of respectively reproduced sector synchronization signals in such a plurality of optical pick-ups where a sector of the reproduced RF signal is used as a reference, can not be matched with a high precision. This is because, even if each optical pick-up is arranged at a position a whole multiple of the sector dividing angle, it is de facto impossible to obtain a sufficient precision due to the limits of the assembly precision and eccentricity of the disk. For this reason, the address detection timing is different in each optical pick-up and also the timing limit of the setting of the power of the laser and so on are different. For this reason, a control circuit for every optical pick-up is necessary and, further, a control circuit for integrating them becomes necessary.

A concrete explanation will be made of a control circuit of such a multi-head optical disk apparatus by referring to FIG. 1.

FIG. 1 is a view showing a reference example of the control circuit of an optical disk apparatus. This control circuit is provided with a first optical pick-up 11 and a second optical pick-up 21 for performing the recording and reproduction of the signal, a first servo control unit 13 and a second servo control unit 23 for performing focusing and tracking, a first laser control unit 14 and a second laser control unit 24 for controlling the power of each laser, and a first microcomputer 91 and a second microcomputer 92 for controlling these parts.

A sector synchronization signal and a sector address information respectively separated from the reproduced RF signal are input to the first microcomputer 91 and the second microcomputer 92 from the first RF signal processing unit 12 and the second RF signal processing unit 22. The first microcomputer 91 and the second microcomputer 92 respectively start the processing accompanied with the input of the sector synchronization signals and read the sector address information from the first RF signal processing unit 12 and the second RF signal processing unit 22. In order to perform the control as mentioned above, the first microcomputer 91 outputs control signals to the first servo processing unit 13 and the first laser control unit 14, and the second microcomputer 92 outputs control signals to the second servo processing unit 23 and the second laser control unit 24.

Further, the first microcomputer 91 and the second microcomputer 92 send information such as seek completion and address read ending to the integrated microcomputer 93 for controlling them. Control information such as "change the laser to erase power" and "seek address 1000" is sent from the integrated microcomputer 93. By this, the first optical pick-up 11 and the second optical pick-up 21 can perform the recording and/or reproduction of the signal at a high speed in cooperation with each other.

In the disk recording and reproducing apparatus as mentioned above, however, it suffers from the disadvantage in that three microcomputers are necessary for the control circuit in a case of the circuit of FIG. 1, so the circuit becomes large in scale and complex and, in addition, the cost is increased.

SUMMARY OF THE INVENTION

An object of the present invention is to provide a disk recording and reproducing apparatus having a control circuit that can easily and efficiently control circuits for a plurality of heads where the disk-like recording medium is simultaneously accessed by these plurality of heads.

Accordingly, a disk recording and reproducing apparatus of the present invention has a plurality of heads for recording or reproducing a signal to or from a disk-like recording medium; a plurality of position control means corresponding to the heads controlling the positions of the heads; a plurality of output control means for controlling the output from the heads for recording or reproducing the signal with respect to said disk-like recording medium; a plurality of reproduced signal processing means corresponding to the heads for extracting at least the synchronization signal output with the same phase for every sector on the disk recording medium based on the reproduced signals obtained from the heads; a phase comparing means for comparing a plurality of the synchronization signals respectively extracted by the plurality of reproduced signal processing means with each other and selecting the signal having the earliest phase; and a head control means for controlling the plurality of position control means and the plurality of output control means by using the selected signal as a reference signal at a timing based on this reference signal.

Preferably, the head control means comprises a single microcomputer for controlling the plurality of position control means and the plurality of output control means respectively corresponding to the plurality of heads based on the reference signal.

Preferably, the head control means performs at least rotation control of the disk-like recording medium during a period where the synchronization signals are obtained from all of the plurality of the heads.

Preferably, two heads among the plurality of heads are arranged on two radii of the disk-like recording medium having an angle of 90 degrees relative to each other.

Preferably, the head control means performs at least a sled servo of these plurality of heads during a period where address signals are read and fetched from all of the plurality of the heads.

BRIEF DESCRIPTION OF THE DRAWINGS

The above and other objects and features of the present invention will be more apparent from the following description of the preferred embodiments given with reference to the accompanying drawings, wherein.

DESCRIPTION OF THE PREFERRED EMBODIMENTS

An explanation will next be made of the optical disk apparatus of an embodiment of the disk recording and reproducing apparatus of the present invention by referring to FIG. 2 to FIG. 7.

Figure 1:
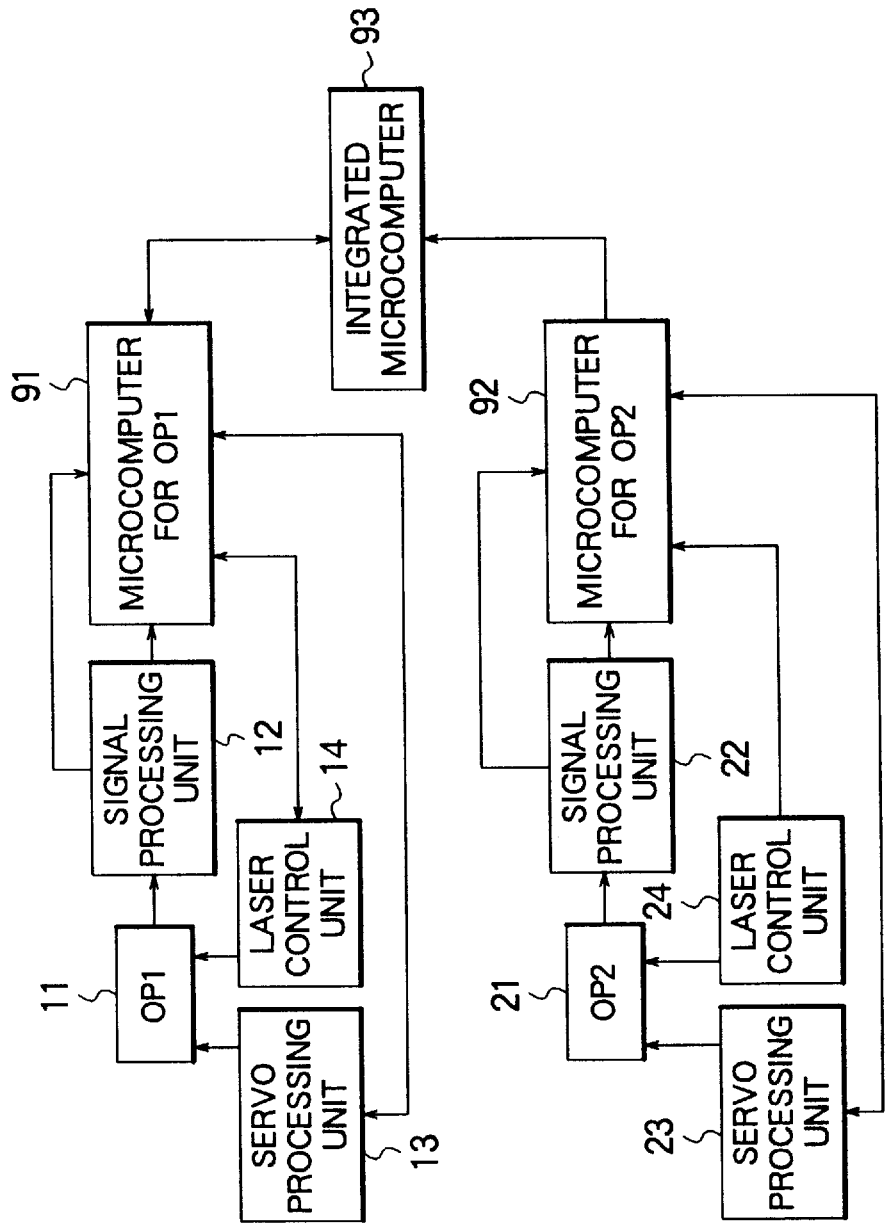
FIG. 1 is a block diagram of the configuration of a comparative example of a control unit of a multi-head optical disk apparatus.
Figure 2:
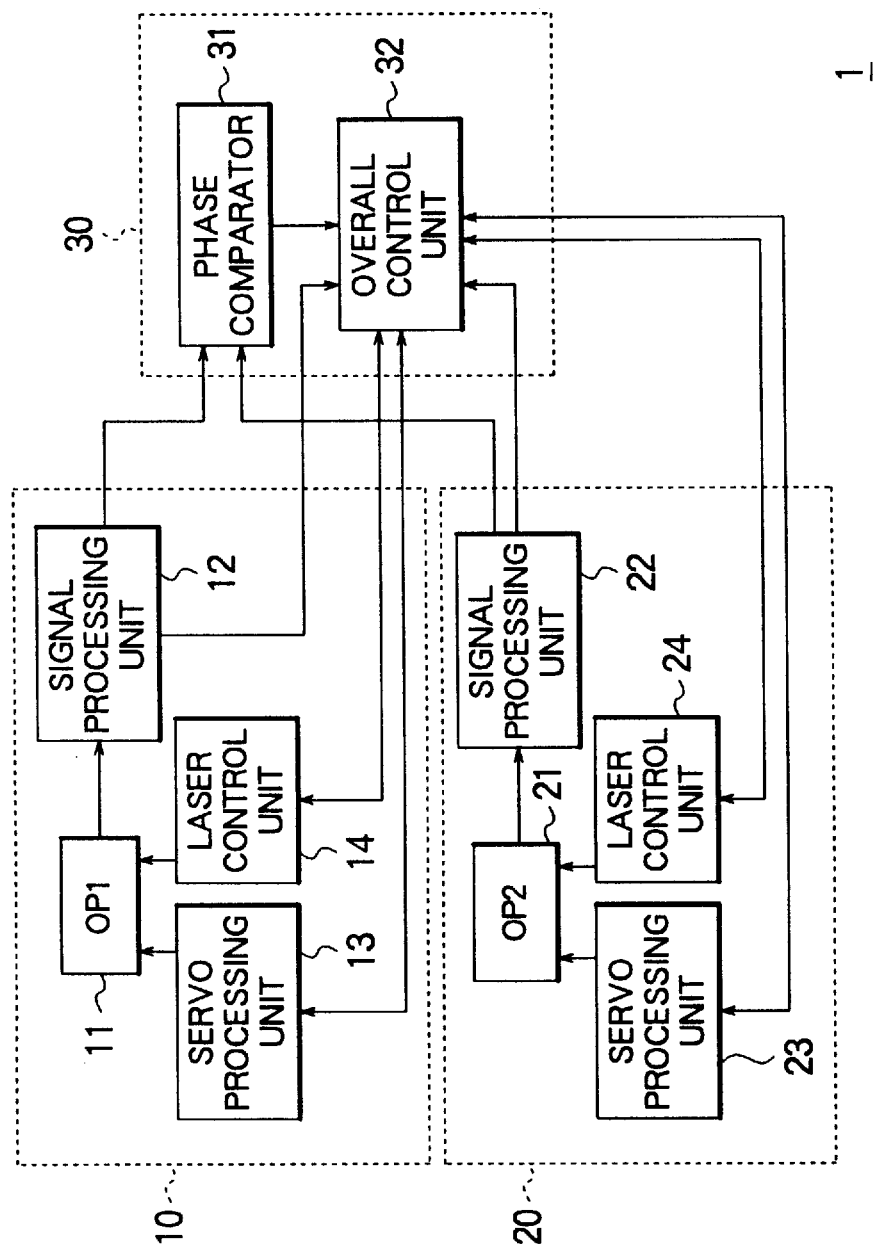
FIG. 2 is a view of the configuration of the optical disk apparatus of an embodiment of the present invention.

FIG. 2 is a block diagram of the configuration of the optical disk apparatus of the present embodiment.

An optical disk apparatus 1 has a first optical head processing unit 10, a second optical head processing unit 20, and a control unit 30. The first optical head processing unit 10 has a first optical pick-up 11, a first RF signal processing unit 12, a first servo processing unit 13, and a first laser control unit 14, and the second optical head processing unit 20 has a second optical pick-up 21, a second RF signal processing unit 22, a second servo processing unit 23, and a second laser control unit 24. Further, the control unit 30 has a phase comparator 31 and an overall control unit 32.

First, an explanation will be made of the recording and/or reproduction method of the signal to and from the optical disk medium by the optical disk apparatus 1 by referring to FIG. 3 and FIG. 4.

Figure 3:
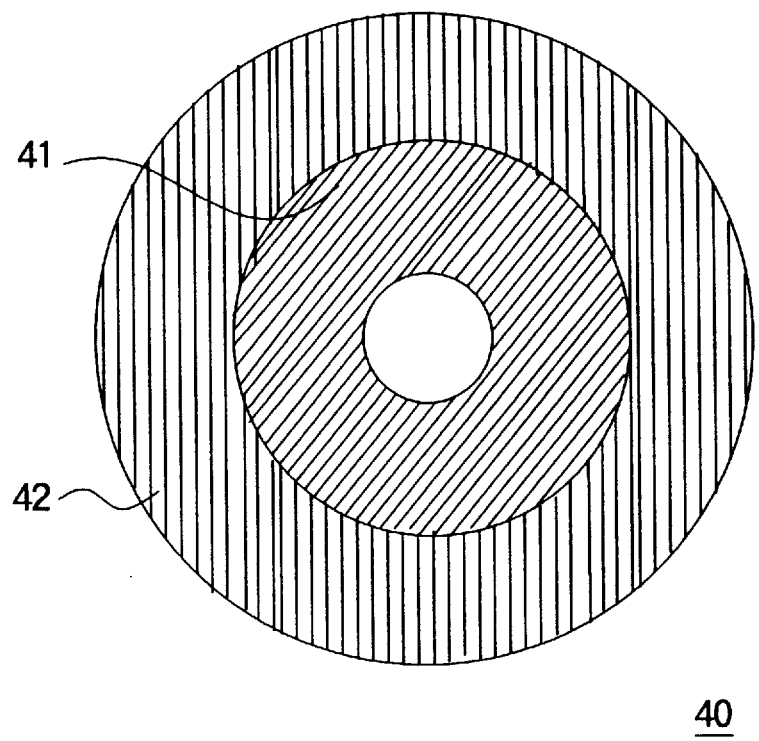
FIG. 3 is a view explaining a state of division of a recording area of an optical disk handled by the optical disk apparatus shown in FIG. 2.
Figure 4:
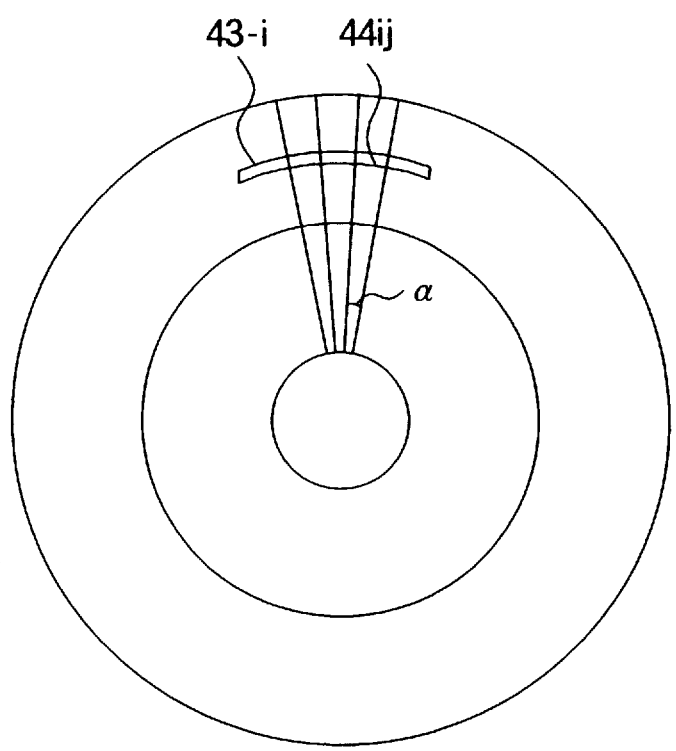
FIG. 4 is a view explaining a recording sector of the optical disk handled by the optical disk apparatus shown in FIG. 2.

The optical disk apparatus 1 divides a user recording region of an optical disk 40 into two areas, i.e., a first area 41 constituted by tracks on the inner circumference side and a second area 42 constituted by tracks on the outer circumference side as shown in FIG. 3, and performs the recording and reproduction of the signal in parallel by different optical pick-ups.

The optical disk apparatus 1 controls the rotation of the optical disk 40 by a constant angular velocity (CAV) system. Accordingly, each track $43_{-i}$ (i is a track number) on the optical disk 40 is provided with a sector $44_{-ij}$ (i is the track number, and j is a sector number of each track) corresponding to the predetermined angle α as shown in FIG. 4.

Next, an explanation will be made of the configuration of the parts of the optical disk apparatus 1.

The first optical head processing unit 10 is a circuit for performing the recording and/or reproduction of a signal with respect to a first area 41 of the optical disk 40 mentioned above, and the second optical head processing unit 20 is a circuit for performing the recording and/or reproduction of a signal with respect to a second area 42. The corresponding parts have substantially the same function.

An explanation will be made next of the first optical pick-up 11 and second optical pick-up 21 by referring to FIG. 5.

Figure 5:
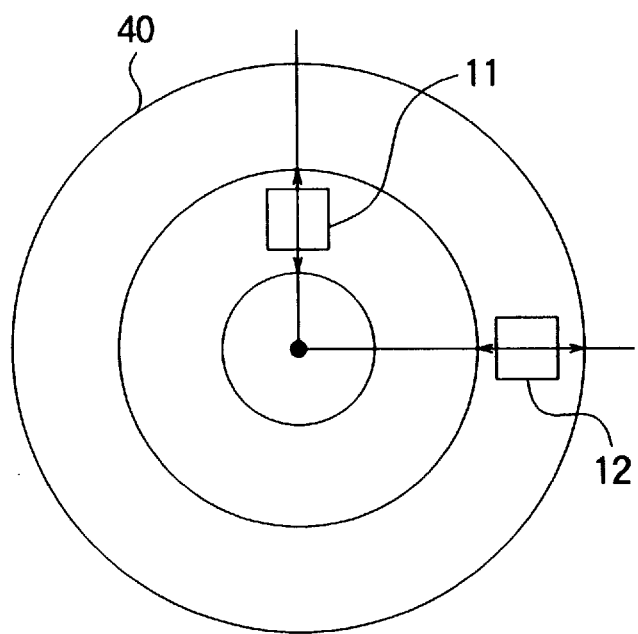
FIG. 5 is a view showing the state where an access is carried out with respect to the optical disk shown in FIG. 3 by two optical pick-ups.

As shown in FIG. 5, the first optical pick-up 11 and the second optical pick-up 21 are arranged on the optical disk 40 provided on straight lines having a predetermined angle relative to each other and intersecting the center of the optical disk 40. The first optical pick-up 11 performs the recording and/or reproduction of the signal with respect to the first area 41, while the second optical pick-up 21 performs the recording and/or reproduction of the signal with respect to the second area 42. These first optical pick-up 11 and second optical pick-up 21 are provided at an angle corresponding to a whole multiple of the angle α corresponding to the sector $44_{-ij}$ shown in FIG. 4, so that the processing can be carried out with respect to the sectors to be accessed with almost the same phase. In the present embodiment, it is 90 degrees.

The first RF signal processing unit 12 and the second RF signal processing unit 22 extract desired signals from the RF signals respectively detected at the first optical pick-up 11 and the second optical pick-up 21. For example, the first RF signal processing unit 12 and the second RF signal processing unit 22 extract the sector synchronization signals indicating the division of the sectors from the input RF signals and output the same to the comparator 31 of the control unit 30. Further, they extract the sector address signals from the input RF signals and output the same to the overall control unit 32 of the control unit 30 according to request.

The first servo processing unit 13 and the second servo processing unit 23 control the positions of the first optical pick-up 11 and the second optical pick-up 21 based on the control signal input from the overall control unit 32, respectively. The first servo processing unit 13 and the second servo processing unit 23 respectively have sled servo units for moving the entire first optical pick-up 11 and second optical pick-up 21 in a tracking direction, tracking servo units for moving the object lenses of the first optical pick-up 11 and the second optical pick-up 21 in the tracking direction so as to make the first and second optical pick-ups 11 and 12 suitably follow the intended track of the optical disk 40, and focus servo units for controlling distances with respect to the optical disks 40 of the object lenses so that light beams emitted from the first optical pick-up 11 and the second optical pick-up 21 are suitably focused on the recording surfaces of the optical disks 40. These parts are controlled based on the control signals input from the overall control unit 32.

The first laser control unit 14 and the second laser control unit 24 control the intensities of the light beams emitted from the first optical pick-up 11 and the second optical pick-up 21 based on the control signals input from the overall control unit 32. These optical beams are set to predetermined intensities in accordance with the operation modes such as the read, write, and erase modes of the data.

The phase comparator 31 of the control unit 30 compares the sector synchronization signal input from the first RF signal processing unit 12 and the sector synchronization signal input from the second RF signal processing unit 22, selects the one preceding sector synchronization signal, and outputs the same to the overall control unit 32.

The overall control unit 32 controls the first servo processing unit 13 and the first laser control unit 14 of the first optical head processing unit 10 and the second servo processing unit 23 and the second laser control unit 24 of the second optical head processing unit 20 by using the sector synchronization signal input from the phase comparator 31 as a signal of reference. In the present embodiment, the overall control unit 32 is constituted by a microcomputer.

Figure 6:
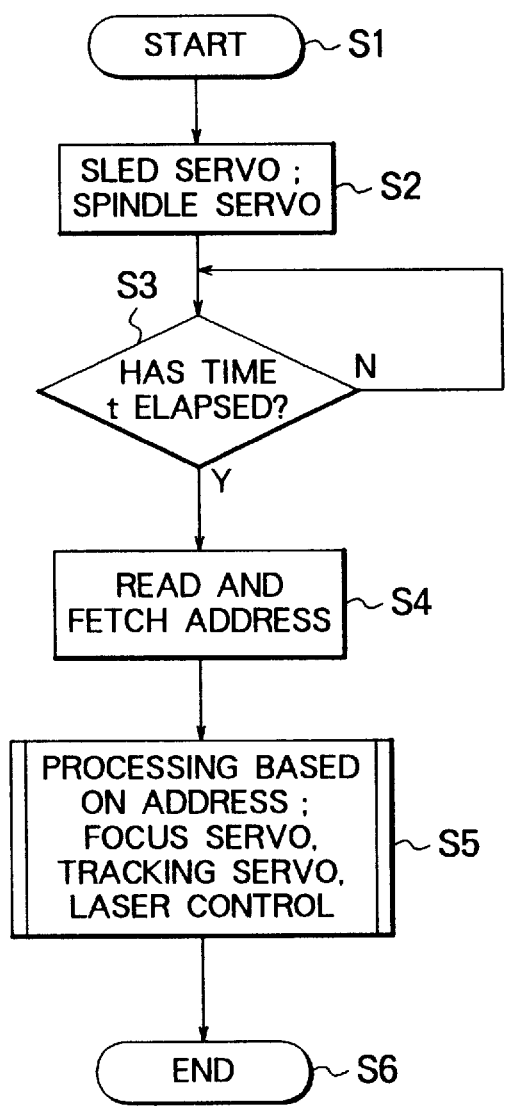
FIG. 6 is a flowchart showing the processing procedure of an overall control unit of the optical disk apparatus shown in FIG. 2.

An explanation will be made next of the above processing in the overall control unit 32 by referring to FIG. 6. The flowchart shown in FIG. 6 shows the flow of the processing executed with respect to a predetermined sector on the optical disk 40.

First, the signal indicating the detection of the preceding sector synchronization signal is input from the phase comparator 31 to the overall control unit 32 as an interruption signal in a state where the focus servo is applied to the first and second pick-ups 11 and 21 (step S1). The overall control unit 32 gives the control signals to the servo processing units 13 and 23 in a time division manner so that the sled servo and spindle servo with respect to the spindle motor of the first optical pick-up 11 and the second optical pick-up 21 are carried out during a period where the addresses at which the first optical pick-up 11 and the second optical pick-up 21 are located are determined (step S2).

Next, it is checked whether or not the predetermined time t determined in advance has elapsed after the sector synchronization signal is input at step S1 (step S3). Where it has lapsed, the sector addresses are read and fetched from the first RF signal processing unit 12 and the second RF signal processing unit 22 (step S4). Where the predetermined time t has not elapsed, the elapse of time is awaited. Note that, this time t is the time corresponding to the time the same as or more than the maximum value of the phase difference of the signal obtained from the first optical pick-up 11 and the signal obtained from the second optical pick-up 21 and determined by taking all of mechanical attachment error etc. into account.

Next, the overall control unit 32 performs the focus servo and tracking servo with respect to the first servo processing unit 13 and the second servo processing unit 23 and the laser output control etc. with respect to the first laser control unit 14 and the second laser control unit 24 in a time division manner based on the read and fetched addresses (step S5). Note that, these servo processings performed at step S5 in the overall control unit 32 generate trigger signals for indicating the start of each servo operation etc. to the servo processing units 13 and 23 and the laser control units 14 and 24.

When these processings are carried out with respect to the pick-ups, one series of control processing is terminated (step S6), the processing routine returns to step S1 for performing the servo operation of each pick-up with respect to the next sector and the processing is repeatedly carried out.

Next, an explanation will be made of the operation of the optical disk apparatus 1.

First, in the optical disk apparatus 1, the recording and/or reproduction of the signal is carried out with respect to the optical disk 40 by using two heads, i.e., the first optical pick-up 11 and the second optical pick-up 21. These two heads, i.e., the first optical pick-up 11 and the second optical pick-up 21, are provided at angles of 90 degrees relative to each other as shown in FIG. 5. The first optical pick-up 11 accesses the first area 41 on the inner circumference side of the optical disk 40, and the second optical pick-up 21 accesses the second area 42 on the outer circumference side of the optical disk 40.

Figure 7:
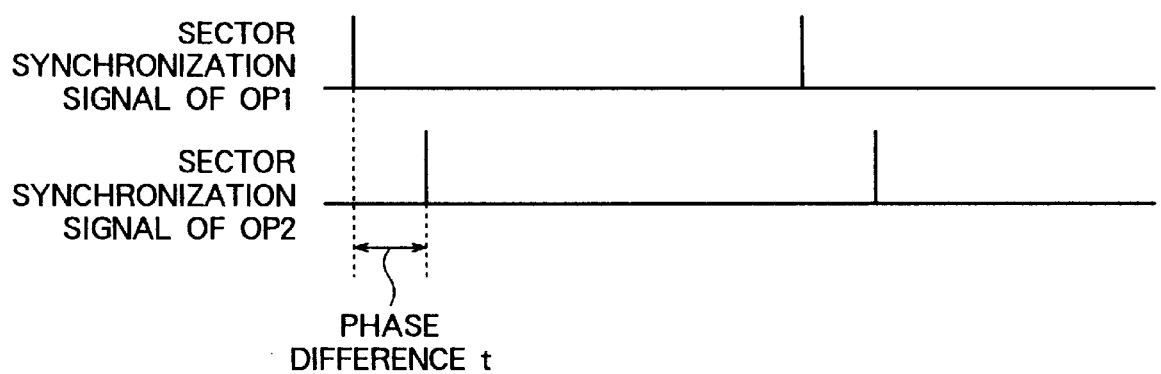
FIG. 7 is a view explaining the phase difference of signals detected by the first optical pick-up and the second optical pick-up of the optical disk apparatus shown in FIG. 2.

The first optical pick-up 11 and the second optical pick-up 21 are designed so as to be able to perform processing with respect to the sector with the same phase, but in actuality, as shown in FIG. 7, the RF signals are output from the pick-ups in a state where the phases are deviated by exactly the time t at the maximum.

Therefore, the sector synchronization signals are separated from these RF signals, input to the phase comparator 31, and compared in the phases thereof and the preceding sector synchronization signal is output to the overall control unit 32. In the overall control unit 32, the processing is carried out with respect to the first optical pick-up 11 and the second optical pick-up 21 by the procedure shown in FIG. 6 by using this input sector synchronization signal as a reference. Specifically, first, the sled servo and spindle servo operation are carried out with respect to the pick-ups during a period where the addresses are determined in the pick-ups. When the addresses are determined, the tracking servo, focus servo, laser control, and other operations are carried out based on these addresses. The overall control unit 32 will control both of the first optical pick-up 11 and the second optical pick-up 21 by just repeating this processing.

In this way, in the optical disk apparatus 1 of the present embodiment, the recording and/or reproduction of the signal are almost simultaneously carried out with respect to a single optical disk medium by using two optical pick-ups. Therefore the recording and/or reproduction of a signal at a transfer rate of two times that of the usual optical disk is possible. Then, at this time, since two pick-ups are controlled together by one overall control device, specifically one microcomputer, these two pick-ups can be efficiently used without overhead and an increase and complication of the configuration of the apparatus due to the use of two pick-ups can be suppressed to the smallest limit.

Further, in the present embodiment, since the sled servo and the spindle servo operation are carried out during a period from when the preceding sector synchronization signal is detected to when the addresses are determined, the microcomputer constituting the overall control unit can be effectively used. Further, periodical processing can be carried out during this period, therefore processings of various control operations such as digital signal processing based on a sampling theorem can be effectively scheduled, therefore the control can be carried out more effectively and adequately by one microcomputer.

Note that, the present invention is not limited to the present embodiment and can be modified in any preferred manner.

For example, in the optical disk 40 of the present embodiment, two pick-ups were used, but the number is not limited to two, that is, three or four is possible. It is also possible to adopt a configuration in which access is almost simultaneously made with respect to any number of pick-ups. Even in a case where there are three or more pick-ups, these plurality of pick-ups can be suitably controlled by a similar configuration to that of the present embodiment. Namely, it is sufficient so far as the sector synchronization signals obtained from these plurality of pick-ups are compared, the earliest sector synchronization signal is selected in the phase comparator, and the pick-ups are controlled by the same procedure as that shown as the flowchart in FIG. 6 by using the earliest sector synchronization signal as a reference in the overall control unit 32.

Further, in the present embodiment, the output of the phase comparator is input to the microcomputer, which serves as the overall control unit, as it is, but it is also possible to pass the same through a PLL (phase locked loop) circuit for noise processing and jitter reduction and then input the same. When performing this, the omission of a pulse of the sector synchronization signal can be more reliably prevented, and the processing can be started at more stable timing. Note that, as this PLL circuit, any usually well known circuit can be applied.

Further, in the present embodiment, the sector synchronization signal selected at the phase comparator is input as the interruption signal to the microcomputer of the overall control unit and the control processing is started, but it is also possible to start the processing not by interruption, but by polling processing for supervising the polarity of the output of the phase comparator.

Further, in the present embodiment, a sector synchronization signal was used as the signal for comparing the signals obtained from the pick-ups, but the signal is not limited to this. Any signals can be used so far as the signals are output with the same phase at one sector.

Further, in the present embodiment, the sled servo and the spindle servo operation are carried out during a period from when the preceding sector synchronization signal is detected to when the addresses are determined, but it is also possible to perform any processing other than them during this term. For example, if there is time, processing such as self diagnosis can be carried out too.

Further, such a control device is not limited to only an optical disk, but can be applied to any recording and reproducing apparatus in which a disk-like recording medium is to be processed such as a hard disk drive or a floppy disk drive apparatus.

According to the disk recording and/or reproducing apparatus of the present invention, when recording and/or reproduction is carried out with respect to a disk-like recording medium by a plurality of heads, the circuits for these plurality of heads can be efficiently controlled by a control circuit having a simple configuration such as a single microcomputer. As a result, a multi-head disk recording and reproducing apparatus capable of performing high speed data transfer, having a higher performance, having a simpler configuration, and cheaper in cost can be provided.

What is claimed is:

1. A disk recording and reproducing apparatus comprising:

a plurality of heads for recording or reproducing a signal to or from a disk-like recording medium;

a plurality of position control means corresponding to the heads controlling the positions of said heads;

a plurality of output control means for controlling the output from said heads for recording or reproducing a signal with respect to said disk-like recording medium;

a plurality of reproduced signal processing means corresponding to said heads for extracting at least a synchronization signal output with the same phase for every sector on said disk recording medium based on the reproduced signals obtained from said heads;

a phase comparing means for comparing a plurality of said synchronization signals respectively extracted by said plurality of reproduced signal processing means with each other and selecting the synchronization signal having the earliest phase; and a head control means for controlling said plurality of position control means and said plurality of output control means by using said selected synchronization signal as a reference signal at a timing based on this reference signal.

2. A disk recording and reproducing apparatus according to claim 1, wherein said head control means comprises a single microcomputer for controlling said plurality of position control means and said plurality of output control means respectively corresponding to said plurality of heads based on said reference signal.

3. A disk recording and reproducing apparatus according to claim 1, wherein said head control means performs at least a rotation control of said disk-like recording medium during a period where the synchronization signals are obtained from all of the plurality of said heads.

4. A disk recording and reproducing apparatus according to claim 1, wherein two heads among the plurality of said heads are arranged on two radii of said disk-like recording medium having an angle of 90 degrees relative to each other.

5. A disk recording and reproducing apparatus according to claim 1, wherein said head control means performs at least a sled servo operation on these plurality of heads during a period where address signals are read and fetched from all of the plurality of said heads.

* * * * *